US011870174B2

(12) United States Patent
Chen et al.

(10) Patent No.: US 11,870,174 B2
(45) Date of Patent: Jan. 9, 2024

(54) ELECTRICAL CONNECTOR

(71) Applicant: Dongguan Luxshare Technologies Co., Ltd, Dongguan (CN)

(72) Inventors: Hongji Chen, Dongguan (CN); Hengshan Cheng, Dongguan (CN); Yunfeng He, Dongguan (CN)

(73) Assignee: DONGGUAN LUXSHARE TECHNOLOGIES CO., LTD, Dongguan (CN)

(*) Notice: Subject to any disclaimer, the term of this patent is extended or adjusted under 35 U.S.C. 154(b) by 0 days.

(21) Appl. No.: 17/568,821

(22) Filed: Jan. 5, 2022

(65) Prior Publication Data

US 2022/0271460 A1 Aug. 25, 2022

(30) Foreign Application Priority Data

Feb. 19, 2021 (CN) ........................ 202110189379.5

(51) Int. Cl.
*H01R 13/10* (2006.01)
*H01R 13/24* (2006.01)

(52) U.S. Cl.
CPC ............ *H01R 13/10* (2013.01); *H01R 13/24* (2013.01)

(58) Field of Classification Search
CPC ..... H01R 23/7068; H01R 13/10; H01R 13/24
USPC ........................................................ 439/637
See application file for complete search history.

(56) References Cited

U.S. PATENT DOCUMENTS 7,867,031 B2 1/2011 Amleshi et al.
7,946,889 B2 * 5/2011 Mizumura ............ H01R 12/89 439/62
8,342,863 B2 1/2013 Kondo et al.
8,550,855 B2 * 10/2013 Zhang ................. H01R 13/405 439/636
9,972,945 B1 5/2018 Huang et al.
10,431,934 B2 10/2019 Toda et al.
10,741,971 B2 8/2020 Long
11,251,558 B1 2/2022 Lee
11,251,569 B2 2/2022 Liao et al.
11,398,693 B2 7/2022 Yang et al.
11,581,688 B2 2/2023 Lin et al.
11,605,921 B2 3/2023 Yang et al.
(Continued)

FOREIGN PATENT DOCUMENTS

CN 101015092 A 8/2007
CN 204947118 U 1/2016
(Continued)

*Primary Examiner* — Gary F Paumen
(74) *Attorney, Agent, or Firm* — Birch, Stewart, Kolasch & Birch, LLP

(57) ABSTRACT

An electrical connector comprising a terminal module and a housing. The terminal module comprises a plurality of terminals. The housing comprises an accommodating groove in which the terminal module is disposed. The accommodating groove comprises a first groove wall and a second groove wall opposite to the first groove wall. The terminal module is disposed between the first groove wall and the second groove wall. A wall surface of the first groove wall and a wall surface of the second groove wall are disposed close to a structural contour of the plurality of terminals. Since the groove wall is designed as a wall surface close to the structural contours of the plurality of terminals, the dielectric constant of the groove wall can be greater than that of the air. In this way, the relative dielectric constant around the plurality of terminals would be increased to reduce the impedance.

8 Claims, 7 Drawing Sheets

(56) References Cited

U.S. PATENT DOCUMENTS

| | | | |
|---|---|---|---|
| 2008/0246555 | A1 | 10/2008 | Kirk et al. |
| 2011/0189895 | A1 | 8/2011 | Ito et al. |
| 2012/0184145 | A1 | 7/2012 | Zeng |
| 2017/0018880 | A1 | 1/2017 | Phillips et al. |
| 2017/0125929 | A1 | 5/2017 | Fujii et al. |
| 2017/0358885 | A1 | 12/2017 | Okuyama et al. |
| 2018/0131145 | A1 | 5/2018 | Zhao |
| 2019/0165518 | A1 | 5/2019 | Hsu et al. |
| 2019/0214755 | A1 | 7/2019 | Manickam |
| 2019/0372274 | A1 | 12/2019 | Feng et al. |
| 2020/0076135 | A1 | 3/2020 | Tang et al. |
| 2020/0099149 | A1 | 3/2020 | Xu et al. |
| 2020/0266584 | A1 | 8/2020 | Lu |
| 2021/0091514 | A1 | 3/2021 | Wu et al. |
| 2021/0159642 | A1 | 5/2021 | Yang et al. |
| 2021/0320448 | A1 | 10/2021 | Chung et al. |
| 2021/0328369 | A1 | 10/2021 | Wu et al. |
| 2022/0115816 | A1 | 4/2022 | Huang et al. |
| 2022/0158388 | A1 | 5/2022 | Chung et al. |

FOREIGN PATENT DOCUMENTS

| | | | |
|---|---|---|---|
| CN | 105703157 | A | 6/2016 |
| CN | 207320484 | U | 5/2018 |
| CN | 207320485 | U | 5/2018 |
| CN | 108832339 | A | 11/2018 |
| CN | 208706931 | U | 4/2019 |
| CN | 209266612 | U | 8/2019 |
| CN | 110867684 | A | 3/2020 |
| CN | 210350162 | U | 4/2020 |
| CN | 111244697 | A | 6/2020 |
| CN | 111262097 | A | 6/2020 |
| CN | 111370945 | A | 7/2020 |
| CN | 111512499 | A | 8/2020 |
| CN | 111525347 | A | 8/2020 |
| CN | 110311242 | B | 10/2020 |
| CN | 212412345 | U | 1/2021 |
| CN | 212412347 | U | 1/2021 |
| TW | M584994 | U | 10/2019 |
| TW | M607468 | U | 2/2021 |
| WO | WO 03/026078 | A1 | 3/2003 |

* cited by examiner

ELECTRICAL CONNECTOR

CROSS-REFERENCE TO RELATED APPLICATION

This application claims the priority benefit of Chinese Patent Application Serial Number 202110189379.5, filed on Feb. 19, 2021, the full disclosure of which is incorporated herein by reference.

BACKGROUND

Technical Field

The present disclosure relates to the technical field of connector, particularly to an electrical connector.

Related Art

In the prior arts, the characteristic impedance of conventional transmission wires needs to be calculated by a two-dimensional field solver. However, for some specific components, such as strip wires, similar formulas could be used for corresponding calculations. It can be seen from the formula that the characteristic impedance of the terminal is inversely proportional to the square root of the relative dielectric constant nearby. When the relative dielectric constant increases, the characteristic impedance would be decreased.

SUMMARY

The embodiments of the present disclosure provide an electrical connector tended to solve the problem that the characteristic impedance does not meet the standard value as conventional electrical connectors are affected by the width of terminals and spacing among terminals.

The present disclosure provides an electrical connector, comprising a terminal module and a housing. The terminal module comprises a plurality of terminals. The housing comprises an accommodating groove in which the terminal module is disposed. The accommodating groove comprises a first groove wall and a second groove wall opposite to the first groove wall. The terminal module is disposed between the first groove wall and the second groove wall. A wall surface of the first groove wall and a wall surface of the second groove wall are disposed close to a structural contour of the plurality of terminals.

In the embodiments of the present disclosure, since the first groove wall and the second groove wall of the housing are designed as wall surfaces close to the structural contours of the plurality of terminals, the dielectric constant of the groove walls can be greater than the dielectric constant of the air. In this way, the relative dielectric constant around the plurality of terminals is large enough to reduce the impedance.

In one embodiment, a dielectric constant of a material of the wall surface of the first groove wall and a dielectric constant of a material of the wall surface of the second groove wall are greater than the dielectric constant of air.

In one embodiment, the plurality of terminals of the terminal module are bent at a bending angle. The wall surface of the first groove wall and the wall surface of the second groove wall are inclined in an inclined surface angle corresponding to the bending angle of the plurality of terminals.

In one embodiment, the bending angle is equal to the inclined surface angle.

In one embodiment, the number of the terminal modules is two. The two terminal modules are oppositely disposed in the housing. The plurality of terminals of the two terminal modules respectively extend in a direction toward the terminal modules oppositely disposed and are inclined at an angle.

In one embodiment, the terminal module comprises an insulating member covering the plurality of terminals. The insulating member is embedded in the accommodating groove of the housing.

In one embodiment, the plurality of terminals of the terminal module further comprises a first section, a second section, and a third section; the first section is secured in the insulating member. The first section extends toward the inner side of the accommodating groove to form the second section. A bending angle is formed between the extending direction of the second section and the extending direction of the first section. The second section is close to the wall surface of the first groove wall or the wall surface of the second groove wall. The third section is extended from the second section to be bent outward and to be secured to the housing.

In one embodiment, the housing further comprises a rib disposed in the accommodating groove. The insulating member is assembled in the accommodating groove. The rib abuts against the insulating member.

In one embodiment, the housing further comprises a positioning groove disposed on an inner wall of the accommodating groove. The insulating member comprises a positioning bump. The insulating member is assembled in the housing. The positioning bump is pushed to be embedded in the positioning groove.

In one embodiment, a bump is provided on the top of the insulating member. The housing further comprises a through hole provided at a position corresponding to the bump of the insulating member in the accommodating groove of the housing. The bump is embedded in the through hole.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

Figure 1:
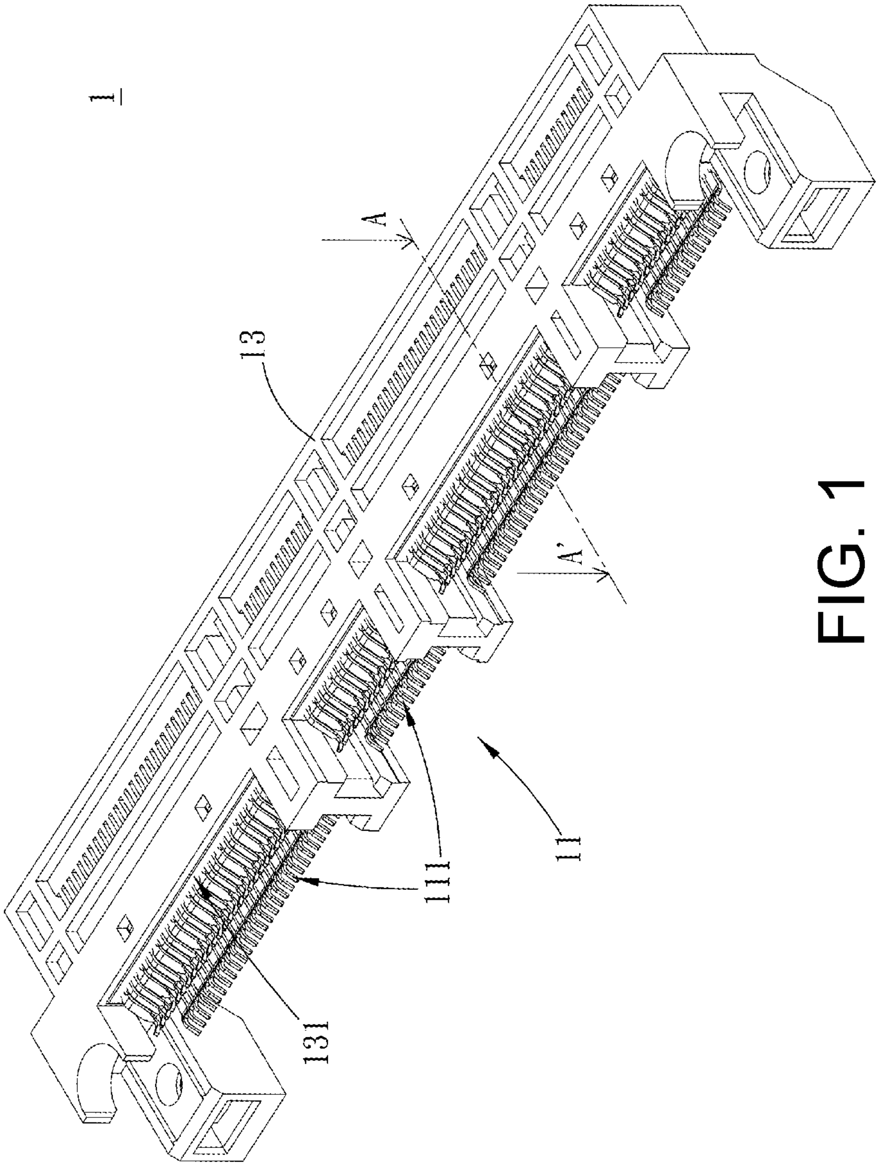
FIG. 1 is a perspective view of an electrical connector of the present disclosure.
Figure 2:
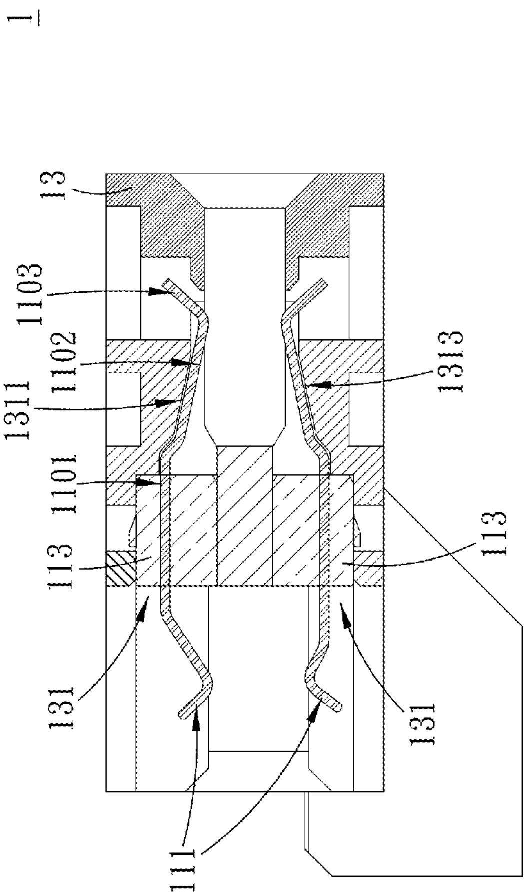
FIG. 2 is an enlarged cross-sectional view along line A-A' of FIG. 1.
Figure 3:
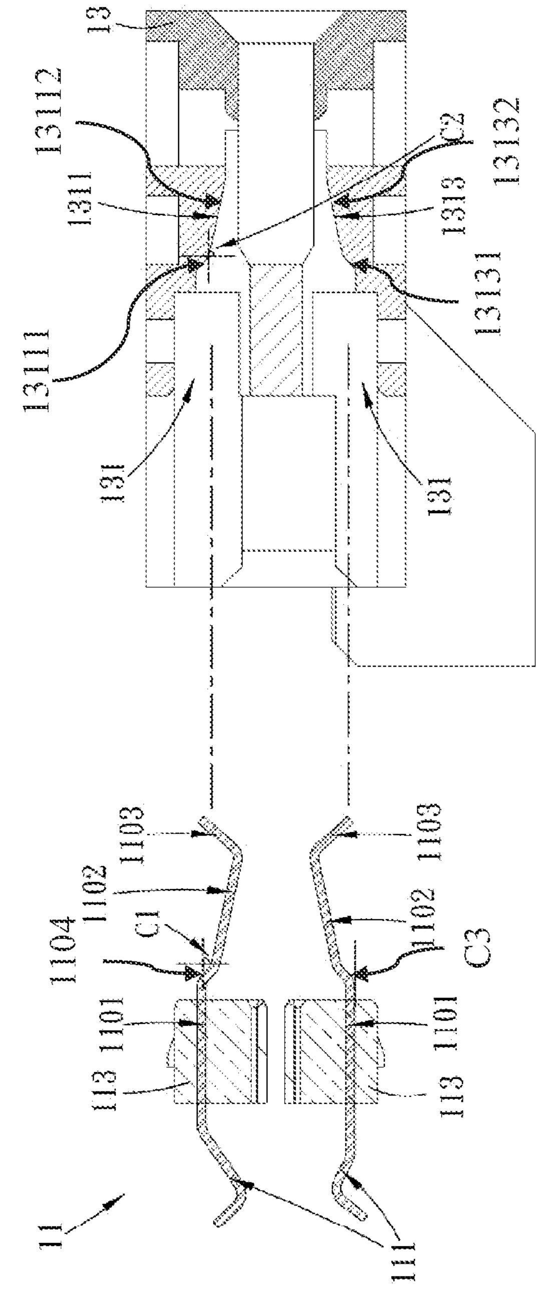
FIG. 3 is an enlarged cross-sectional exploded view of the electrical connector of the present disclosure.
Figure 4:
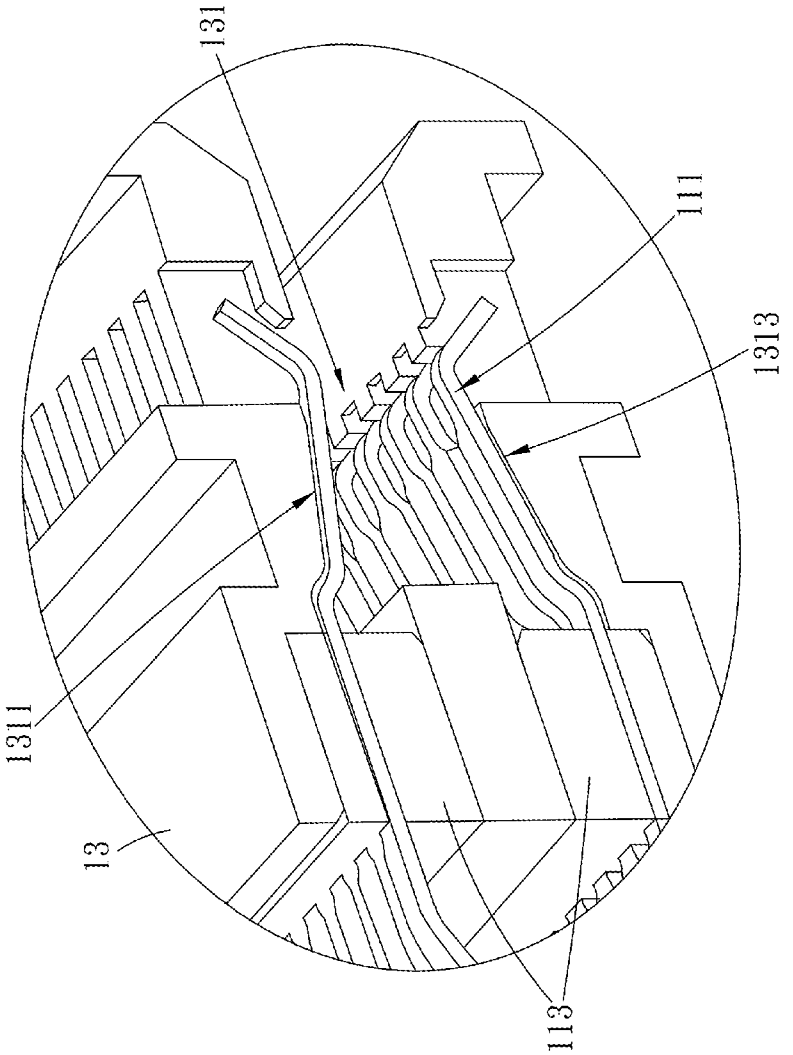
FIG. 4 is a partially enlarged cross-sectional perspective view of the electrical connector of the present disclosure.

FIG. 1 is a perspective view of an electrical connector of the present disclosure. FIG. 2 is an enlarged cross-sectional view along line A-A' of FIG. 1. FIG. 3 is an enlarged cross-sectional exploded view of the electrical connector of the present disclosure. FIG. 4 is a partially enlarged cross-sectional perspective view of the electrical connector of the present disclosure. As shown in the figures, this embodiment provides an electrical connector 1, which can be used for high-speed data or signal transmission and can be applied to Gen Z connectors. In this embodiment, the electrical connector 1 comprises a terminal module 11 and a housing 13. The terminal module 11 comprises a plurality of terminals 111. The housing 13 comprises an accommodating groove 131 in which the terminal module 11 is disposed. The accommodating groove 131 comprises a first groove wall 1311 and a second groove wall 1313 opposite to the first groove wall 1311. The terminal module 11 is disposed between the first groove wall 1311 and the second groove wall 1313. A first wall surface 13111 and a second wall surface 13112 of the first groove wall 1311 and a first wall surface 13131 and a second wall surface 13132 of the second groove wall 1313 are disposed close to the structural contours of the plurality of terminals 111.

In this embodiment, the number of the terminal modules 11 is two. The two terminal modules 11 are oppositely disposed in the housing 13. The terminal module 11 comprises an insulating member 113, which covers the plurality of terminals 111. The insulating member 113 is embedded in the accommodating groove 131 of the housing 13. The plurality of terminals 111 of the two terminal modules 11 respectively extend in a direction toward the terminal modules 11 oppositely disposed and are inclined at an angle. In other words, the plurality of terminals 111 are present in a structural configuration which are bent and concentrated toward the center part. The plurality of terminals 11 of the terminal module 11 are bent at a bending angle C1. The second wall surface 13112 of the first groove wall 1311 or/and the second wall surface 13132 of the second groove wall 1313 are inclined in an inclined surface angle C2 corresponding to the bending angle C1 of the plurality of terminals 111. Wherein the bending angle C1 is equal to the inclined surface angle C2 so that the first groove wall 1311 or/and the second groove wall 1313 can be as close as possible to the periphery of the plurality of terminals 111.

In this embodiment, the plurality of terminals 111 of the terminal module 11 further comprises a first section 1101, a second section 1102, a third section 1103 and a fourth section 1104. The first section 1101 of the plurality of terminals 111 is secured in the insulating member 113. The first section 1101 extends toward the accommodating groove 131 to form the fourth section 1104, the second section 1102 and the third section 1103. The extending direction of the fourth section 104 and the extending direction of the second section 1102 form the bending angle C1. The extending direction of the first section 1101 and the extending direction of the fourth section 1104 form the bending angle C3. The fourth section 1104 extends toward the inner side of the accommodating groove 131 to form the second section 1102. The fourth section 1104 of the plurality of terminals 111 can be close to the first wall surface 13111 of the first groove wall 1311 (or the first wall surface 13131 of the second groove wall 1313). The second section 1102 of the plurality of terminals 111 can be close to the second wall surface 13112 of the first groove wall 1311 (or the second wall surface 13132 of the second groove wall 1313). The first wall surface 13111 is inclined to correspond to the bending angle C3 and the second wall surface 13112 is inclined to correspond to the bending angle C1. The third section 1103 of the plurality of terminals 111 is extended from the extending end of the second section 1102 to be bent outward, so that the third section 1103 of the plurality of terminals 111 can be secured to the housing 13.

Figure 5:
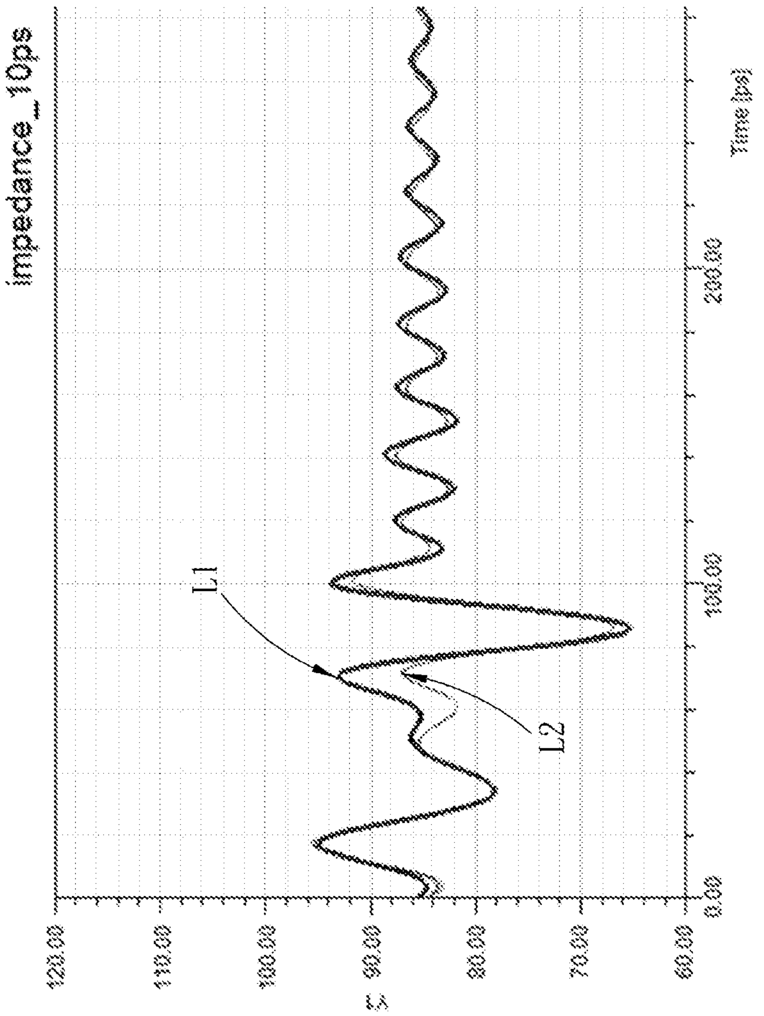
FIG. 5 is a graph of the resistance impedance data of the present disclosure.

FIG. 5 is a graph of the resistance impedance data of the present disclosure. As shown in the figure, FIG. 5 indicates two experimental data of the resistance and impedance, including data line L1 (thick lines) and data line L2 (thin lines). Generally, when there is no change for the first groove wall 1311 and the second groove wall 1313, the detected resistance impedance is considered as the data line L1. When the thickness of the first groove wall 1311 and the thickness of the second groove wall 1313 are increased, the resistance impedance detected at the structural contours of the plurality of terminals 111 where the wall surfaces of the first groove wall 1311 and the wall surfaces of the second groove wall 1313 are close to is considered as the data line L2. In this embodiment, the resistance impedance data indicates the difference before and after the change of the configuration of the groove wall close to the terminal 111 structural contours. The above can explain that the impedance value can be effectively reduced by changing the wall surfaces of the first groove wall 1311 and the wall surfaces of the second groove wall 1313. Besides, the resistance and impedance data of this embodiment is for reference only, and the actual resistance and impedance data may be changed due to environmental or material factors.

In this embodiment, by increasing the thickness of the first groove wall 1311 and the second groove wall 1313, the resistance characteristic can be controlled. The dielectric constant of the material of the wall surfaces of the first groove wall 1311 and the material of the wall surfaces of the second groove wall 1313 are greater than the dielectric constant of air, such as conductive plastic. When the plurality of terminals 111 are bent at the bending angle C1, the first groove wall 1311 and the second groove wall 1313 would be as close as possible to the structural contours of the plurality of terminals 111 by changing the inclined surface angle C2. In this way, the relative dielectric constant of the plurality of terminals would be increased, to reduce the resistance and impedance.

Figure 6:
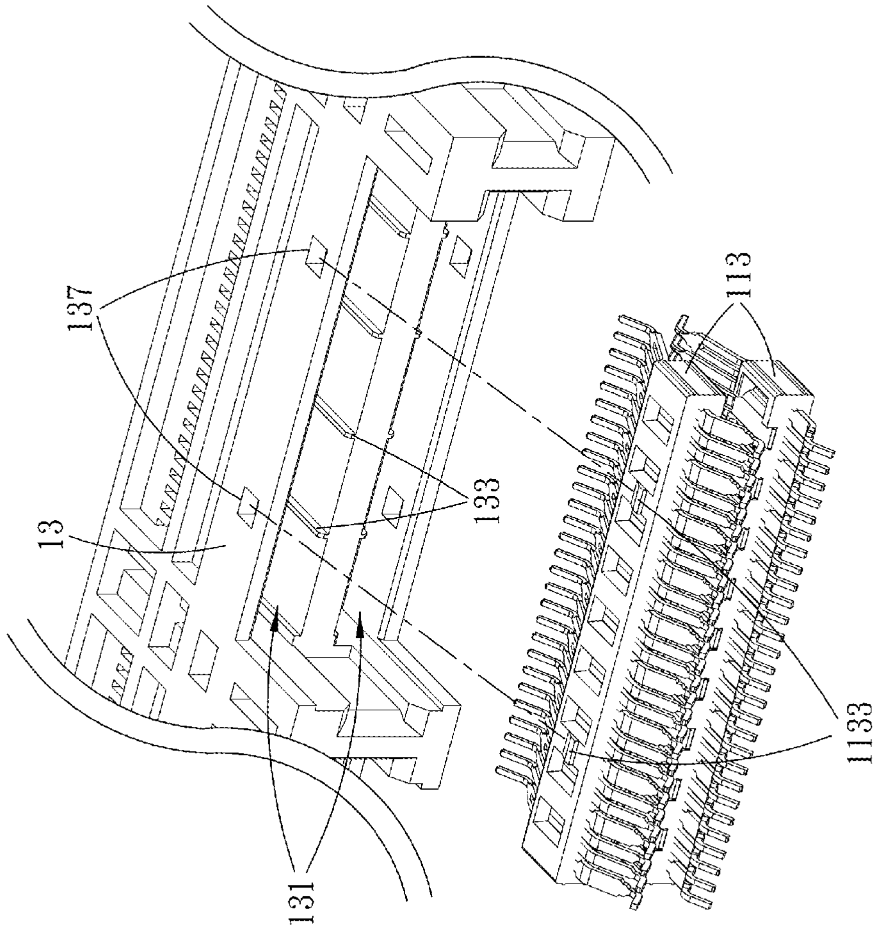
FIG. 6 is a structural assembly diagram of the electrical connector of the present disclosure.

FIG. 6 is a structural assembly diagram of the electrical connector of the present disclosure. As shown in the figure, in this embodiment, the housing 13 further comprises a rib 133. The rib 133 is disposed in the accommodating groove 131 in which the insulating member 113 is assembled. The rib 133 abuts against the bottom of the insulating member 113 so that the insulating member 113 is secured in the accommodating groove 131.

Figure 7:
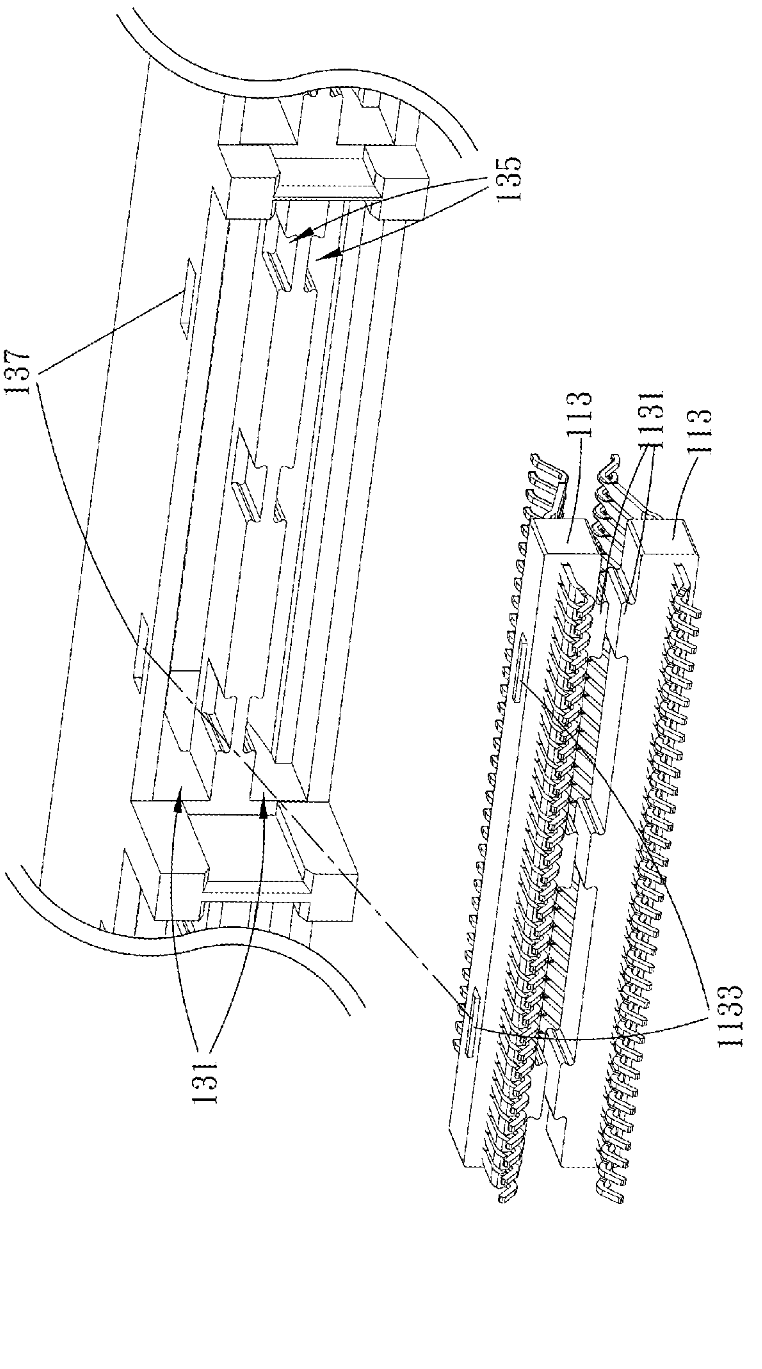
FIG. 7 is another structural assembly diagram of the electrical connector of the present disclosure.

FIG. 7 is another structural assembly diagram of the electrical connector of the present disclosure. As shown in the figure, in this embodiment, the housing 13 further comprises a positioning groove 135, which is disposed on an inner wall of the accommodating groove 131. The insulating member 113 comprises a positioning bump 1131. The insulating member 113 is assembled in the housing 13. The positioning bump 1131 can be pushed to be embedded into the positioning groove 135 so that the insulating member 113 can be secured in the accommodating groove 131. The positioning bump 1131 protrudes from the bottom of the insulating member 113. The bump body of the positioning bump 1131 is narrow and the bump end is thick, that is, an outer diameter of the positioning bump 1131 close to the bottom of the insulating member 113 is relatively narrow. The positioning groove 135 is a component with a narrow opening and a wide bottom, corresponding to the positioning bump 1131. In this way, the positioning bump 1131 can only be pushed into the positioning groove 135 through the opening on the side of the positioning groove 135.

Referring to FIG. 6 and FIG. 7, in the above two embodiments, the top of the insulating member 113 is provided with a bump 1133. The housing 13 comprises a through hole 137. In the accommodating groove 131 of the housing 13, the through hole 137 is provided at a position corresponding to the bump 1133 of the insulating member 113. The insulating member 113 is assembled in the accommodating groove 131. The bump 1133 is embedded in the through hole 137.

In summary, embodiments of the present disclosure provide an electrical connector. Since the first groove wall and the second groove wall of the housing are designed as wall surfaces close to the structural contours of the plurality of terminals, the dielectric constant of the groove walls can be greater than the dielectric constant of the air. In this way, the relative dielectric constant around the plurality of terminals is large enough to reduce the impedance.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An electrical connector, comprising:

a terminal module comprising a plurality of terminals;

a housing comprising an accommodating groove in which the terminal module being disposed, the accommodating groove comprising a first groove wall and a second groove wall opposite to the first groove wall, the terminal module being disposed between the first groove wall and the second groove wall, a wall surface of the first groove wall and a wall surface of the second groove wall being disposed close to a structural contour of the plurality of terminals, wherein the terminal module comprises an insulating member covering the plurality of terminals; the insulating member is embedded in the accommodating groove of the housing, wherein the plurality of terminals of the terminal module further comprises a first section, a second section, a third section and a fourth section; the first section is secured in the insulating member; the first section extends toward the inner side of the accommodating groove to form the fourth section; a first bending angle is formed between the extending direction of the fourth section and the extending direction of the first section; the fourth section extends toward the inner side of the accommodating groove to form the second section; a second bending angle is formed between the extending direction of the fourth section and the extending direction of the second section; the first groove wall or the second groove wall comprises a first wall surface and a second surface, the first wall surface is inclined to correspond to the first bending angle and the second wall surface is inclined to correspond to the second bending angle; the fourth section is close to the first wall surface and the second section is close to the second wall surface of the first groove wall or the second groove wall; the third section is extended from the second section to be bent outward and to be secured to the housing.

2. The electrical connector according to claim 1, wherein a dielectric constant of a material of the wall surface of the first groove wall and a dielectric constant of a material of the wall surface of the second groove wall are greater than the dielectric constant of air.

3. The electrical connector according to claim 1, wherein the plurality of terminals of the terminal module are bent at a bending angle; the wall surface of the first groove wall and the wall surface of the second groove wall are inclined in an inclined surface angle corresponding to the bending angle of the plurality of terminals.

4. The electrical connector according to claim 3, wherein the bending angle is equal to the inclined surface angle.

5. The electrical connector according to claim 1, wherein the number of the terminal modules is two; the two terminal modules are oppositely disposed in the housing; the plurality of terminals of the two terminal modules respectively extend in a direction toward the terminal modules oppositely disposed and are inclined in an angle.

6. The electrical connector according to claim 1, wherein the housing further comprises a rib disposed in the accommodating groove; the insulating member is assembled in the accommodating groove; the rib abuts against the insulating member.

7. The electrical connector according to claim 1, wherein the housing further comprises a positioning groove disposed on an inner wall of the accommodating groove; the insulating member comprises a positioning bump; the insulating member is assembled in the housing; the positioning bump is pushed to be embedded in the positioning groove.

8. The electrical connector according to claim 1, wherein a bump is provided on the top of the insulating member; the housing further comprises a through hole provided at a position corresponding to the bump of the insulating member in the accommodating groove of the housing; the bump is embedded in the through hole.

* * * * *